(12) United States Patent
Maeno et al.

(10) Patent No.: US 7,066,032 B2
(45) Date of Patent: Jun. 27, 2006

(54) PRESSURE CONVERTER

(75) Inventors: Yoshihiko Maeno, Funabashi (JP); Koichi Yabe, Kawasaki (JP)

(73) Assignee: Educational Foundation Nihon University, Tokyo (JP)

( * ) Notice: Subject to any disclaimer, the term of this patent is extended or adjusted under 35 U.S.C. 154(b) by 59 days.

(21) Appl. No.: 10/485,453

(22) PCT Filed: Mar. 13, 2002

(86) PCT No.: PCT/JP02/02375

§ 371 (c)(1),
(2), (4) Date: Jan. 29, 2004

(87) PCT Pub. No.: WO03/012385

PCT Pub. Date: Feb. 13, 2003

(65) Prior Publication Data

US 2004/0200292 A1    Oct. 14, 2004

(30) Foreign Application Priority Data

Jul. 31, 2001    (JP) .............................. 2001-232935

(51) Int. Cl.
  *G01B 7/16* (2006.01)
(52) U.S. Cl. .......................................... 73/768; 73/700
(58) Field of Classification Search .................. 73/760, 73/768, 772, 784
See application file for complete search history.

(56) References Cited

U.S. PATENT DOCUMENTS

| 4,175,445 A | * | 11/1979 | Templeton, III ............. 73/768 |
| 4,211,301 A | * | 7/1980 | Mifsud ........................ 181/120 |
| 6,017,597 A | * | 1/2000 | Minakami et al. ......... 428/34.4 |

FOREIGN PATENT DOCUMENTS

| JP | 5-187939 | 7/1993 |
| JP | 2000-65656 | 3/2000 |

* cited by examiner

*Primary Examiner*—Max Noori
(74) *Attorney, Agent, or Firm*—Jordan and Hamburg, LLP

(57) ABSTRACT

A pressure converter insusceptible to the error of hydraulic pressure introducing position or the interference of installation depth of water and producing a signal corresponding to the effective soil pressure accurately while realizing cost reduction. Since filters are provided in an air gap defined by two rigid plates receiving the soil pressure, a hydraulic pressure is applied but sand pressure is not applied. A load gauge insensitive to the hydraulic pressure detects only the effective soil pressure. Since a signal cable can be passed through the air gap, a plurality of pressure converters can be coupled efficiently and since the signal cable can be inserted internally, a pressure distributed in the depth direction can also be measured accurately.

10 Claims, 13 Drawing Sheets

PRIOR ART

US 7,066,032 B2

PRESSURE CONVERTER

BACKGROUND OF THE INVENTION

The present invention relates to a pressure converter and more specifically to a pressure converter for detecting soil pressure (here after, referred to as "effective earth pressure") which eliminates pore water pressure in the ground, such as at the bottom of dams, in river beds, sea beds and sediment slopes, and also for detecting a micro fluctuation of the pore water pressure (hereafter, referred to as "dynamic pore water pressure") among soil particles forming the ground and then outputting such data as transmission signals.

Naturally, as the ground at the bottom of a dam, river bed, sea bed or sediment slope is repeatedly accumulated and eroded, sediment gravel, dirt and sand determines geological features and influences structures constructed on the ground, which makes it necessary to examine soil pressure (hereafter, referred to as "earth pressure") in the ground beforehand. The earth pressure generally includes soil skeleton pressure of soil particles forming the ground and pore water pressure among the soil particles. This pressure is generally called "total earth pressure." In addition, the pore water pressure is the pressure of air and water mixture.

Furthermore, the earth pressure, which excludes pore water pressure from the total earth pressure is called "effective earth pressure." Therefore, it is possible to determine whether the ground is strong enough for constructing underground structures or whether the slope of the ground is stable by measuring the effective earth pressure or the pore water pressure in the ground. It is also becoming possible to determine whether the surface of sediment dirt and sand has risen or fallen.

A conventional example for conducting such measurement is an electrical pressure converter which the present inventor et al. have proposed in U.S. Pat. No. 2,696,099.

FIG. 12 is a cross-sectional view showing the configuration of an effective earth pressure gauge according to the conventional example (hereafter, referred to as "first conventional example").

In FIG. 12, at the center of the front and rear surfaces of the strain starting, portion 81, pressure receiving rods 83, 83 are united as one structure or integrally fixed so that the rods coaxially protrude from the main body 82. A sword-guard shaped pressure receiving plate 84, 84 is provided at each top end of the pressure receiving rod 83, 83.

An expandable bellows 85, 85 is mounted between each pressure receiving plate 84, 84 and the main body 82 so that the bellows 85, 85 seals the opening to prevent moisture from sinking into the above-mentioned strain starting portion 81 side. At a central portion and a peripheral edge of both front and rear surfaces of the strain starting portion 81, a plurality of strain gauges 86 are attached to function as elements which convert the amount of deformation of the strain starting portion 81 into an electrical signal, thereby forming the Wheatstone Bridge, not shown in the drawing.

On the outer peripheral edge side of one (the upper one in the drawing) of the above-mentioned pressure receiving plates 84 and bellows 85, a filter 93 is mounted to the main body 82 by a screw-in means or the like so that a hydraulic pressure chamber 88 is defined by the surrounding filter. Furthermore, on the outer peripheral edge side of the other pressure receiving plate 84 and bellows, a portion of the main body 82 is projected like a sword-guard, and a thin pressure-receiving diaphragm 94 is installed on the cross-section of the main body to form a detecting portion 95 which faces the pressure receiving plate 94 with micro pores interposed. The detecting portion 95 is filled with a liquid 96, such as hydraulic oil or the like.

AAn earth pressure gauge, configured as stated above, is designed so that when it is buried in the ground, the surface of the pressure receiving diaphragm 94 receives overalltotal earth pressure including soil skeleton pressure of soil particles and pore water pressure. On the other hand, the filter 93 prevents soil particles from entering but allows only pore water to enter so that the hydraulic pressure chamber 88 receives pore water pressure.

Therefore, between soil skeleton pressure and pore water pressure applied to the pressure receiving diaphragm 94, the pore water pressure is cancelled by the pore water pressure on the filter 93 side, and therefore, only soil skeleton pressure (this is called "effective earth pressure") is applied to the strain starting portion 81 via the pressure receiving plate 84 and the pressure receiving rod 83. Accordingly, an electrical signal corresponding to the effective earth pressure can be obtained by the strain gauge 86. This earth pressure measurement detects the magnitude of the earth pressure in the ground, which makes it possible to determine the strength of the ground before structures are constructed.

FIG. 13 is a cross-sectional view showing the configuration of a dynamic pore water pressure gauge disclosed in U.S. Pat. No. 2,696,099 (hereafter, referred to as "second conventional example").

In FIG. 12, on the outer periphery side of the lower pressure receiving plate 84 and bellows 85, a portion of the main body 82 is projected like a sword-guard, and a thin pressure-receiving diaphragm 94 is installed on the cross-section to form a detecting portion 95 which faces the pressure receiving plate 94 with micro pores interposed. However, in FIG. 13, instead of providing the detecting portion 95, a filter 89, having the attenuation characteristic different from the upper filter 90, is mounted to the main body 82 by a screw-in means or the like so that a hydraulic pressure chamber 87 is defined as the result of the filter surrounding the pressure receiving plate 84 and the bellows 85.

As shown in the characteristics diagram in FIG. 14 showing the relationship between the fluctuation frequency (Hz) of the measured pressure and the attenuation factor of the filter [Pb/Po], one filter 89 uses a rough-mesh filter with the A-characteristic curve which does not attenuate pressure waves until a high frequency is reached, and the other filter 90 uses a filter with the B-characteristic curve which attenuates pressure waves at a lower frequency compared to the above-mentioned filter 89. Furthermore, concerning symbols indicating the attenuation factor of the above-mentioned filters, Po denotes an input pressure value and Pb denotes an output signal pressure value.

A dynamic pore water pressure gauge, configured as stated above, is buried in the ground of the seabed, for example. Hydraulic pressure caused by water depth, that is, static hydraulic pressure (hereafter, referred to as "hydrostatic pressure", is applied through the filters 89, 90 without generating a pressure difference between the hydraulic pressure chambers 87, 88 even if attenuation characteristics of the filters 89, 90 are different; and pare water pressure is uniformly applied to the pressure receiving plates 84, 84. As a result, the strain starting portion 81 is not deformed and the strain gauge 86 does not generate any electrical outputs, and therefore, hydrostatic pressure is cancelled.

However, if dynamic pore water pressure occurs due to the wave having a specific period in the pore water within the ground, the difference in the attenuation characteristics of the filters 89, 90 causes a pressure difference between two hydraulic pressure chambers 87, 88.

That is, as FIG. 14 shows, because dynamic pore water pressure in the hydraulic pressure chamber 87 side which has a filter 89 having the A-characteristic curve becomes high, the pressure deforms the strain starting portion 81 via a pressure receiving plate 84, and the amount of deformation of the strain starting portion 81 is detected as an electrical resistance value by a strain gauge 86. Accordingly, it is possible to detect an electrical signal corresponding to the dynamic pore water pressure from the output end of the bridge formed by the strain gauge.

As a consequence, regardless of the magnitude of the hydraulic pressure caused by water depth or earth pressure, it is possible to measure a micro fluctuation of the dynamic pore water pressure caused by an earthquake or other movements of the earth's crust. Furthermore, the dynamic pore water pressure data indicates the strength of the ground, which is an excellent indication used for the design, construction and safety management of the structures to be constructed.

The effective earth pressure gauge according to the above first conventional example and the dynamic pore water pressure gauge according to the above second conventional example enable the measurement of the effective earth pressure and the dynamic pore water pressure. However, each of those conventional examples uses two bellows 85, 85 having the same spring constant and applies the configuration of a differential pressure gauge in which the strain starting portion 81 located inside those bellows 85, 85 is deformed due to a liquid pressure generated outside the bellows 85.

In the configuration that uses two bellows 85, 85, as FIGS. 12 and 13 show, there is a head difference between the height from the differential pressure center position to the bellows' pressure load position A and the height from the differential pressure center position to the bellows' pressure load position B, which affects the measured pressure. Therefore, this becomes a problem when generated effective stress has to be measured highly accurately with an error of less than 1-CM head.

If the device shown in FIGS. 12 and 13 is rotated 90-degrees and installed, the head difference can be eliminated. In that case, however, when effective earth pressure is measured, symmetry in the vertical earth pressure direction is deformed, and when dynamic pore water pressure is a measured, the transverse rectangle shape makes it difficult to insert and install the device into the ground, that is, generally through a small-diameter bore hole.

Moreover, in fact, since it is difficult to obtain two bellows which have quite the same spring constant, bellows which have approximately similar spring constant may be used. Due to the difference between those spring constants, an interference output which has nothing to do with the hydrostatic pressure caused by the depth of installation is applied to the bellows as an interference output. In an effective earth pressure gauge, as FIG. 12 shows, earth pressure is applied from the pressure receiving diaphragm 94 to one bellows 85 via the pressure of the liquid 96 that fills in the diaphragm chamber; and in some cases, the effect cannot be ignored.

Recently, a plurality of effective earth pressure gauges and dynamic pore water pressure gauges are coupled to measure the effective earth pressure and the dynamic pore water pressure distributed in the depth direction.

However, if a plurality of bellows-type pressure converters according to the above-mentioned first and second conventional examples is are coupled in the multi-stage arrangement, the problems described below arise.

That is, if a first pressure converter 110, a second pressure converter 120, a third pressure converter 130 and so on are sequentially connected in the multi-stage arrangement, as shown in FIG. 15, via connecting pipes 114, 124, 134, signal cables 111, 121, 131 must be extended to the other sides along the outer surface of the pressure converters 110, 120, 130.

In addition, to protect each signal cable 111, 121, 131, a protective member 113, 123, 133, and a protective pipe 112, 122, 132 that is connected to the protective member must be installed so that the signal cable 11, 121, 131 can pass through the protective member and the protective pipe.

As FIG. 15 shows, the signal cable 111, 121, 131 extends from the connecting pipe 114, 124, 134, passes through the protective members 113, 123, 133, and then extends along the outer circumferential surfaces of the cylindrical main bodies of the first through third pressure converters 110 through 130 and the filters 115, 125, 135 while being covered by the protective pipe 112, 122, 132. Accordingly, the configuration around the cable becomes large, which may disturb the observed soil pressure or the signal cable may be exposed to an environment where it is easily abraded.

BRIEF SUMMARY OF THE INVENTION

To solve the above-mentioned problems, the first objective of the present invention is to provide a pressure converter, which can detect effective earth pressure by means of a direct differential force.

The second objective of the present invention is to provide a pressure converter, which can detect effective earth pressure, thatwhich is not interfered by hydrostatic pressure caused by the depth of installation.

Furthermore, the third objective of the present invention is to provide a pressure converter, which is easily installed horizontally and easily inserted vertically.

The fourth objective of the present invention is to provide a pressure converter, which can easily detect pressure distributed in the longitudinal direction.

Moreover, the fifth objective of the present invention is to provide a pressure converter, which can detect dynamic pore water pressure thatwhich is not interfered by hydrostatic pressure caused by the depth of installation.

To achieve the above-mentioned first through third objectives, the invention is configured such that a load gauge, which does not cause output fluctuation even if air pressure and hydraulic pressure are directed via a filter and applied between two rigid plates, is installed in an air gap defined by two rigid plates which receive earth pressure, and said load gauge detects a signal corresponding to the effective earth pressure.

To achieve the above-mentioned first through third objectives, the invention is configured such that a thin-walled elastic portion is disposed at an end portion of at least one of said two rigid plates so that a load in proportion to earth pressure can be transmitted to said load gauge without disturbing the deformation by earth pressure.

To achieve the above-mentioned first through third objectives, the invention is configured such that the shape of the pressure receiving surface of said rigid plate is circular, a thin-walled elastic portion is disposed in the vicinity of the peripheral edge of the opposite surface from the pressure receiving surface of at least one rigid plate, said two rigid plates are disposed so that their opposite surfaces from the pressure receiving surfaces inwardly face each other, said load gauge is interposed between the central portions of said two rigid plates, and a support and a filter are interposed between the peripheral edge portions of said two rigid plates.

To achieve the above-mentioned first through third objectives, the invention is configured such that the shape of the pressure receiving surface of said rigid plate is rectangle, a thin-walled elastic portion is disposed in the vicinity of the longitudinal end portion of the opposite surface from the pressure receiving surface of at least one said rigid plate, the opposite sides of the pressure receiving surfaces inwardly face each other, said load gauge is interposed between the central portions of said two rigid plates, a support is interposed between the longitudinal end portions of said two rigid plates, and a filter is interposed between the transverse end portions of said two rigid plates.

To achieve the above-mentioned first through third objectives, the invention is configured such that the shape of the transverse cross-section of the pressure receiving surface of said rigid plate is generally semicircular, a thin-walled elastic portion is disposed in the vicinity of the longitudinal end portion of at least one rigid plate, opposite sides of the pressure receiving surfaces inwardly face each other, said load gauge is interposed between the central portions of said two rigid plates, a support is interposed between the longitudinal end portions of said two rigid plates, and a filter is interposed between the transverse end portions of said two rigid plates.

To achieve the above-mentioned first through fourth objectives, the invention is configured such that said two rigid plates are coupled in the longitudinal direction in a multi-stage arrangement, and an output signal cable of said load gauge successively passes through an air gap defined as the result of said load gauge being interposed between said two rigid plates.

To achieve the above-mentioned first through third objectives, the invention is configured such that a thin-walled elastic portion is disposed at an end portion of at least one of two rigid plates which receive earth pressure, an optical-fiber strain gauge or strain gauge is attached to the opposite surface side from the pressure receiving surface of said thin-walled elastic portion, the opposite sides of the pressure receiving surfaces inwardly face each other, a support and a filter are interposed between the end portions of said two rigid plates, and said optical-fiber strain gauge or strain gauge, which does not cause output fluctuation even if air pressure and hydraulic pressure are directed via said filter and applied between said two rigid plates, detects a signal corresponding to the effective earth pressure.

To achieve the above-mentioned fifth objective, the invention is configured such that a filter having slow responsiveness to hydraulic pressure is interposed between the end portions of said two rigid plates which receive hydraulic pressure, a load gauge is interposed between the central portions of said two rigid plates, a filter having fast responsiveness to hydraulic pressure is disposed so that it surrounds said two rigid plates, and said load gauge detects a signal corresponding to the dynamic pore water pressure.

To achieve the above-mentioned fifth objective, the invention is configured such that a thin-walled elastic portion is disposed at an end portion of at least one of two rigid plates which receive earth pressure, an optical-fiber strain gauge or strain gauge is attached to the opposite surface side from the pressure receiving surface of said thin-walled elastic portion, the opposite sides of the pressure receiving surfaces inwardly face each other, a filter having slow responsiveness to hydraulic pressure is interposed between the end portions of said two rigid plates, a filter having fast responsiveness to hydraulic pressure is disposed so that it surrounds said two rigid plates, and said optical-fiber strain gauge or strain gauge detects a signal corresponding to the dynamic pore water pressure.

To achieve the above-mentioned third and fourth objectives, the invention further comprises a plurality of supports provided between adjacent pressure converters and a coupling plate which extends between adjacent supports and is mounted to said supports so as to connect a plurality of pressure converters in a longitudinal column arrangement, thereby distributing loads in the directions other than the measurement direction to said supports and said coupling plate. This configuration prevents loads other than the earth pressure in the measurement direction from being applied during the installation, insertion and measurement processes.

When a pressure converter, configured as stated above, is turned in the ground, hydrostatic pressure caused by water depth, that is, static hydraulic pressure is directed via the filter to an air gap defined by two rigid plates which receive the earth pressure. Since a pressure difference does not occur at a load point, said hydrostatic pressure is cancelled.

On the other hand, soil skeleton pressure in the ground, that is, an effective earth pressure load becomes a force which pushes agains the pressure receiving surfaces of a pair of rigid plates and is applied to the load gauge. Consequently, a signal corresponding to the effective earth pressure is detected by the load gauge.

Although the hydrostatic pressure in the ground is cancelled as stated above if the pore water pressure caused by pore water in the ground has the waveform with a cycle greater than the prescribed cycle resulting in fluctuations, as shown in the present invention, a pressure difference occurs between the inside and outside of an air gap due to the difference of attenuation characteristics between a filter having slow responsiveness to hydraulic pressure which is interposed between the end portions of two rigid plates which receive a hydraulic pressure and a filter having fast responsiveness which is provided to surround the two rigid plates. This pressure difference deforms a load gauge interposed between the two rigid plates, and the amount of deformation is converted into an electrical signal by an element such as a strain gauge or an optical-fiber strain gauge, thereby an electrical signal corresponding to the pore water pressure can be detected.

BRIEF DESCRIPTION OF THE DRAWINGS

Accompanying the specification are figures which assist in illustrating the embodiments of the invention, in which.

DETAILED DESCRIPTION OF THE INVENTION

Hereafter, embodiments of the present invention will be described in detail with reference to the drawings.

Figure 1:
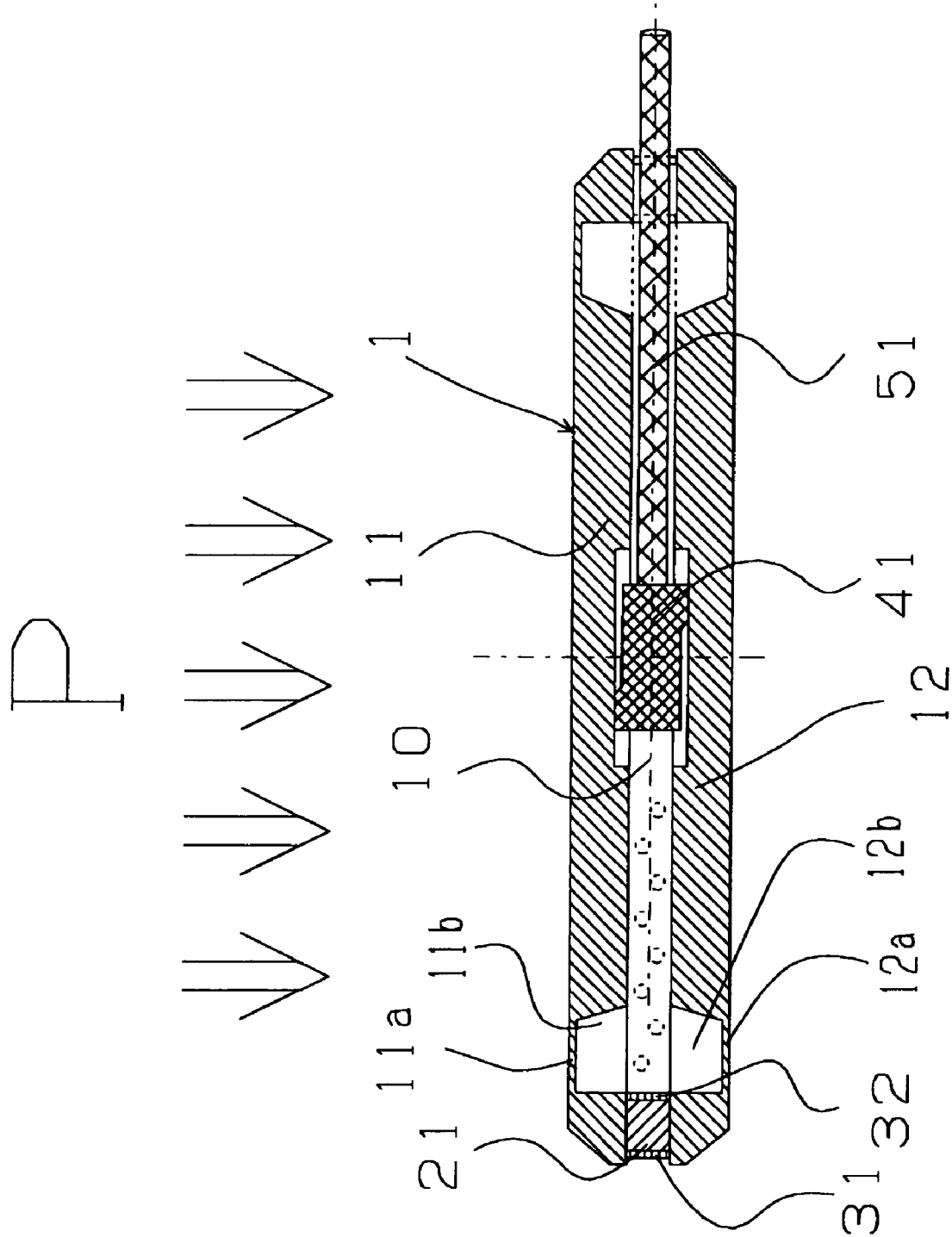
FIG. 1 is a cross-sectional view showing the configuration of a pressure converter for detecting effective earth pressure, according to a first embodiment of the present invention, wherein rigid plates are discoid.
Figure 2:
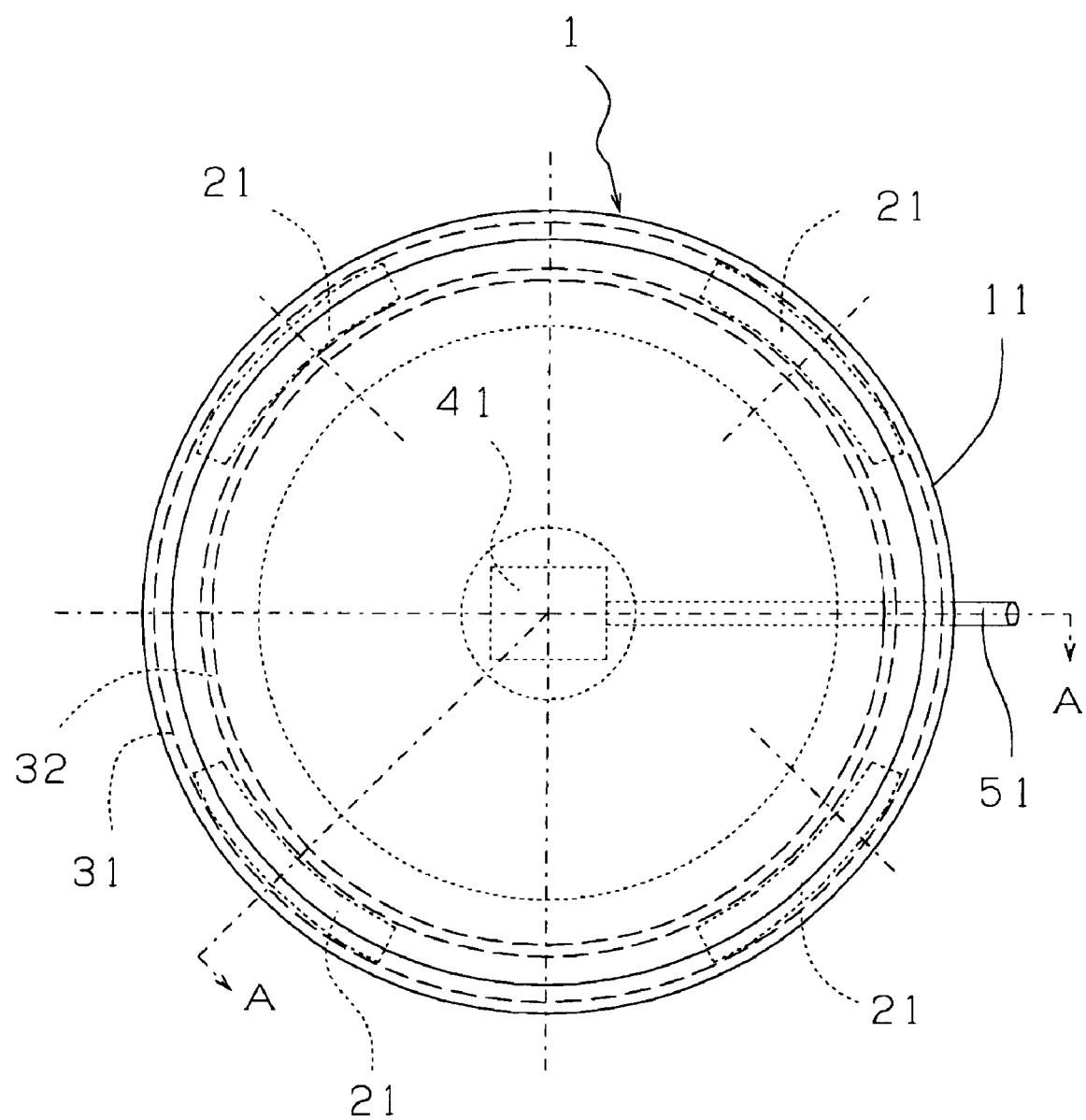
FIG. 2 is a plan view of the pressure converter shown in FIG. 1.

FIGS. 1 and 2 show the configuration of a pressure converter, according to a first embodiment of the present invention, which can detect effective earth pressure. FIG. 1 is a cross-sectional view viewed in the direction of the A—A line shown in FIG. 2, and FIG. 2 is a plan view.

In FIGS. 1 and 2, two circular rigid plates 11, 12 are thick rigid plates made of stainless steel or the like. The rigid plate looks like a disc in a plan view and the pressure receiving surface is made flat. On the other hand, at the central portion of the opposite surface from the pressure receiving surface, a shallow concave portion is formed to install a load gauge 41, and a groove 11b, 12b whose cross-sectional form is trapezoid is annularly cut out in the vicinity of the peripheral edge, resulting in forming a thin-walled elastic portion 11a, 12a.

Thus, each of two circular rigid plates 11, 12 consists of a thick rigid portion from the central portion toward the vicinity of the peripheral edge, a thin-walled elastic portion (flexible portion) in the vicinity of the peripheral edge, and a thick mounting portion in the peripheral edge area.

In this embodiment, two circular rigid plates 11, 12 are designed as the same shape or symmetrical shape. Their opposite surfaces from the pressure receiving surfaces, that is, the surfaces on which the grooves 11b, 12b are formed inwardly face each other. And, a load gauge 41 is disposed in the shallow concave portion created at the central portions of the two circular rigid plates 11, 12, and three supports 21 are interposed at equiangular (120 degrees) intervals between their peripheral edge portions. And then, the upper and lower load introducing portions (fulcrum) of the load gauge 41 are mounted to the circular rigid plates 11, 12 by a screw-in means or the like. At this point, a signal cable 51 for directing signals from the load gauge 41 is externally pulled out through an air gap 10 defined by the two circular rigid plates 11, 12.

After that, two filters 31, 32 are annularly interposed between the two circular rigid plates 11, 12 in the vicinity of the peripheral edges with a constant interval in the radius direction provided between those two filters. This configuration allows air and water to enter an air gap 10, but blocks large particles of dirt and sand, thereby preventing the deformation of the rigid plates 11, 12 due to dirt and sand that has entered the air gap and also preventing the elastic deformation of the thin-walled elastic portions 11a, 12a due to earth pressure.

As FIG. 11 shows, the load gauge 41 used herein detects the load having two fulcrums: two load introducing portions 41a, 41b. This load gauge in principle produces no output when liquid pressure around the load gauge 41 changes the pressure, that is, a pressure interference error is significantly small.

When earth pressure P acts on the pressure converter 1 having such a load gauge 41, as shown in FIG. 1, pore water pressure Pw included in total earth pressure P is directed into the air gap 10 through the filters 3, 32; however, soil skeleton pressure Ps cannot enter the air gap 10. Therefore, load F, which is defined by the following equation, acts on the load gauge 41.

$$F=(Ps+Pw)\cdot A-Pw\cdot A=Ps\cdot A \quad (1)$$

Herein, P=Ps+Pw, P: total earth pressure, Ps: soil skeleton pressure (effective earth pressure)

Pw: pore pressure, A: earth pressure gauge's effective loading area

To facilitate understanding of the principle, the thin-walled elastic portion 11a of the two rigid plates 11, 12 is used to explain the principle. The thin-walled elastic portion 11a functions as a spring, which is elastically deformed in proportion to the earth pressure as well as the load gauge 41. Therefore, assuming that the spring constant of the thin-walled elastic portion 11a is represented by k1 and the spring constant of the load gauge 41 is represented by k2, spring constant k at the central portion of the effective earth pressure gauge can be defined by equation (2).

$$k=k1+k2 \quad (2)$$

In the light of the equation (2), even if a plurality of load gauges 41, four load gauges for example, are installed between the two circular rigid plates 11, 12 at equiangular intervals according to the on-site situation, the operation principle does not change. Furthermore, as seen in a second embodiment shown in FIG. 3, it is possible to use elastic support of the load gauge 41 only instead of providing a thin-walled elastic portion 11a and a support 21.

Figure 3:
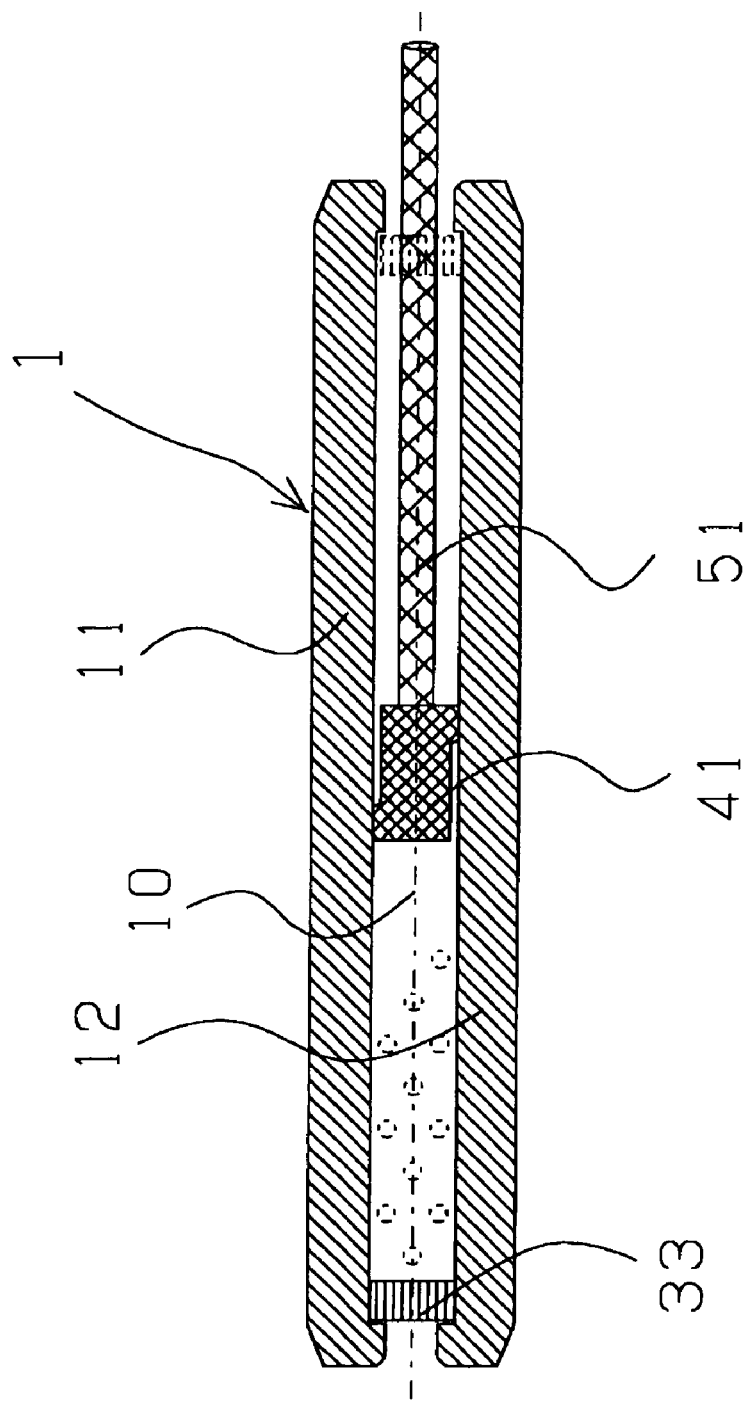
FIG. 3 is a cross-sectional view showing the configuration of a pressure converter for detecting vertical effective earth pressure, according to a second embodiment of the present invention, wherein the peripheral edge of the rigid plates is not fixed.

In this configuration, all that the filter 33, shown in FIG. 3, has to do is to prevent sand intrusion from the air gap 10; therefore, simple synthetic fiber or sponge can be utilized.

Although the above explanation uses circular rigid plates 11, 12, their pressure receiving surfaces can be rectangle or semicircular as third and fourth embodiments show. In that case, it is possible to measure distribution pressure by connecting a plurality of effective earth pressure gauges in the multi-stage arrangement.

Figure 4:
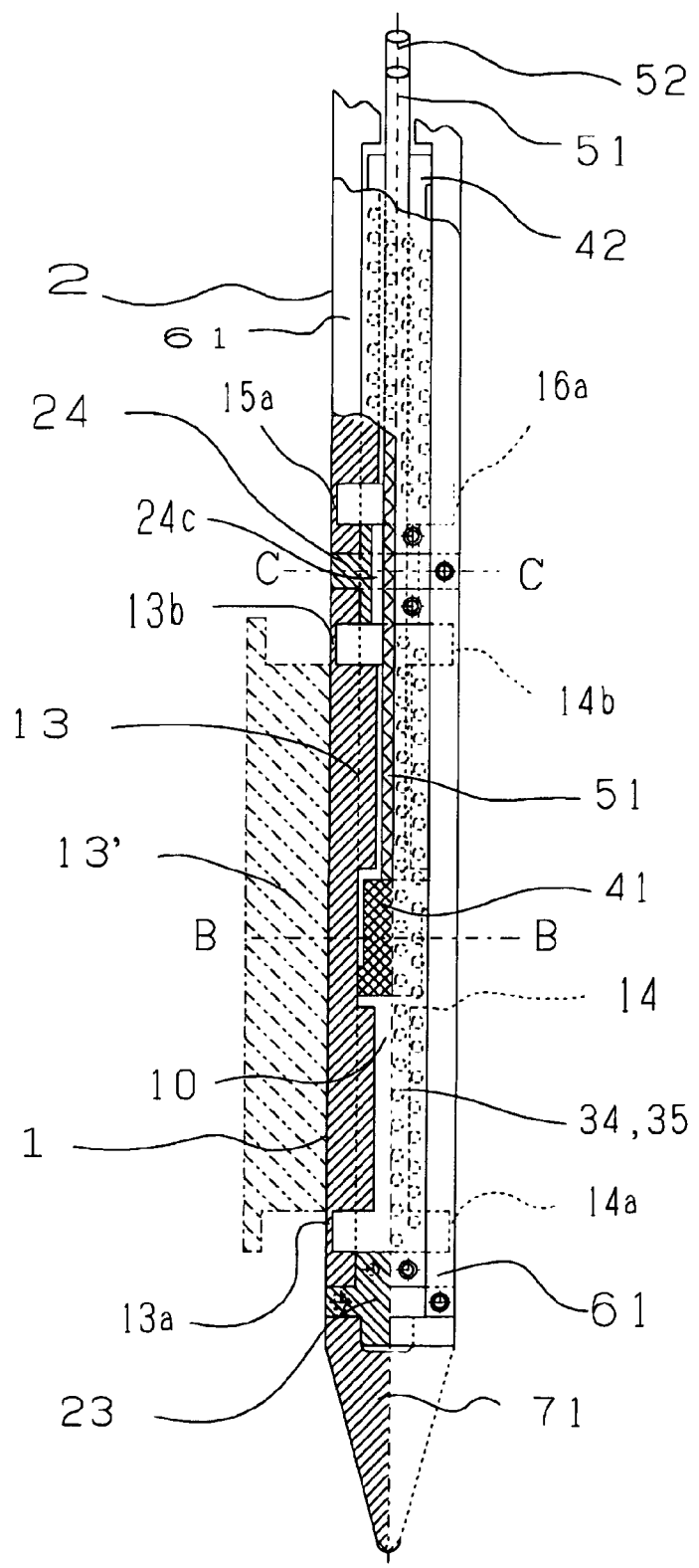
FIG. 4 is a semi-cross-sectional view showing the configuration of a pressure converter unit according to third and fourth embodiments of the present invention, which can detect a plurality of effective earth pressures.
Figure 5:
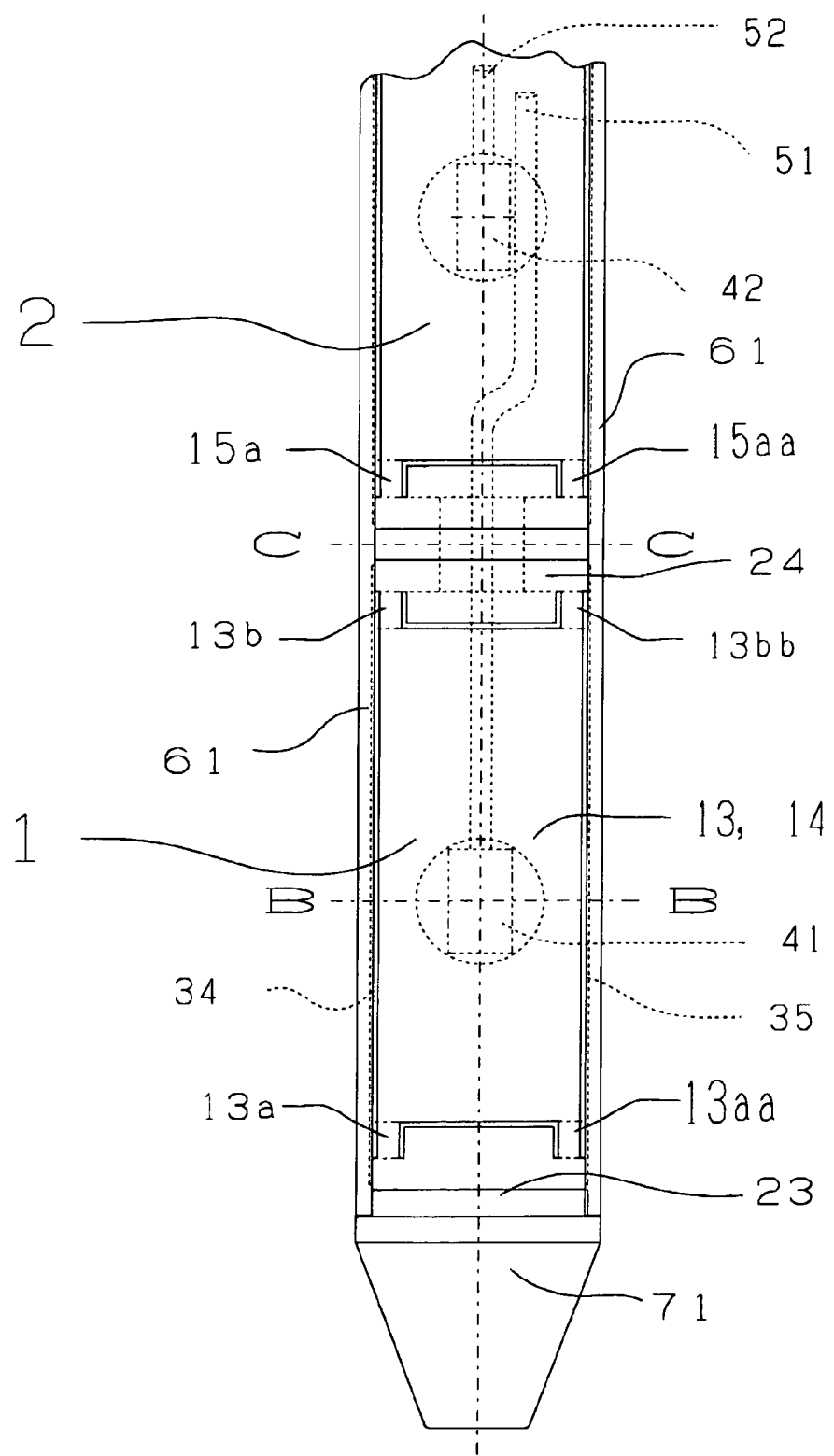
FIG. 5 is a front view of the pressure converter shown in FIG. 4.
Figure 6:
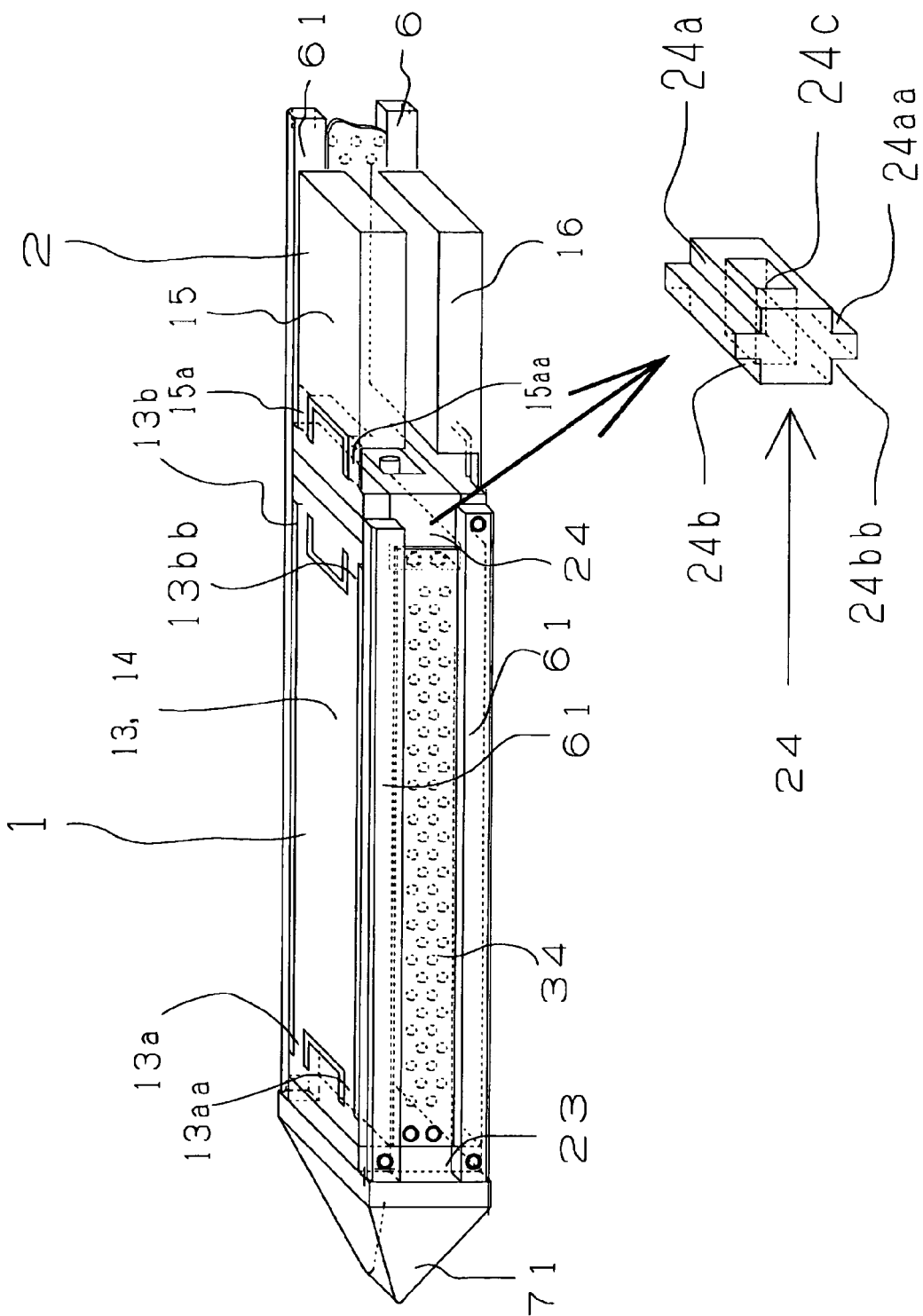
FIG. 6 is a perspective view showing the configuration of the pressure converter shown in FIG. 4.
Figure 7:
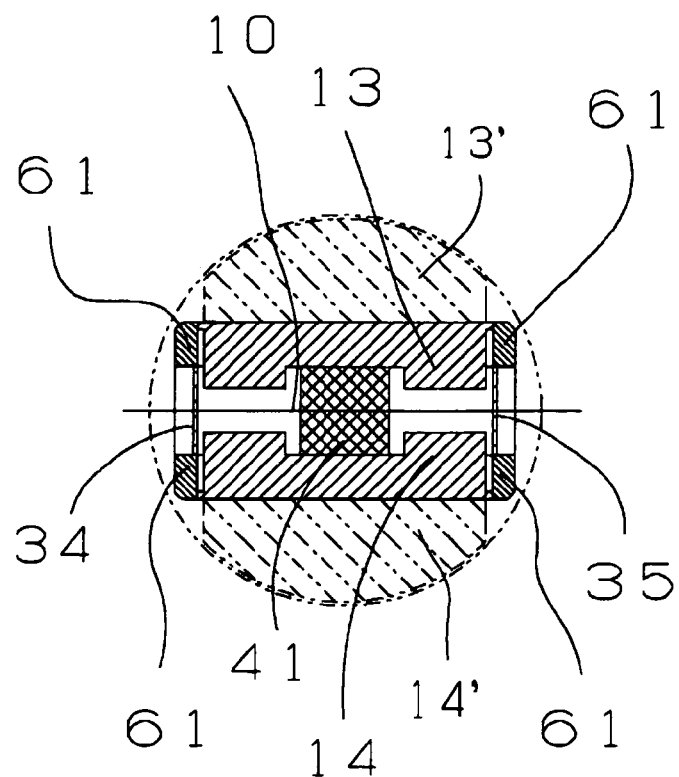
FIG. 7 is a cross-sectional view viewed in the direction of the B—B line shown in FIG. 4.
Figure 8:
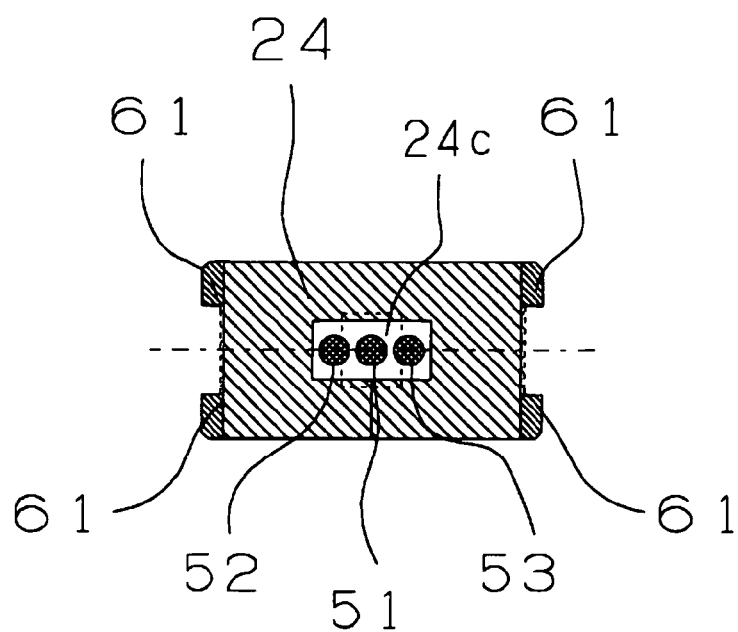
FIG. 8 is a cross-sectional view viewed in the direction of the C—C line shown in FIG. 4.

Next, with reference to FIGS. 4, 5, 6 and 7, a third embodiment, which uses a plurality of pressure converters having rectangle rigid plates, will be explained. FIG. 4 is a side cross-sectional view, FIG. 5 is an enlarged plan view, FIG. 6 is a perspective view, FIG. 7 is a cross-sectional view viewed in the direction of the B—B line shown in FIG. 5, and FIG. 8 is a cross-sectional view viewed in the direction of the C—C line shown in FIG. 5.

An insertion head 71 is mounted to the base end (lower end in FIG. 5) of the support 23 to reduce resistance as the device is inserted into the ground on site.

In FIG. 4, two rectangle rigid plates 13, 14 are mounted to the support 23 with a set screw at a clamping portion located outside of one site of thin-walled elastic portions 13a, 14a, and they are also mounted to the support 24 with a set screw at a clamping portion located outside of the other thin-walled elastic portions 13b, 14b.

However, before the above clamping work is conducted, a load gauge 41 must be installed in the air gap 10 defined by the two rectangle rigid plates 13, 14 according to the above-mentioned procedures.

Instead of using a load gauge 41, optical-fiber strain gauges or strain gauges (including semiconductor gauge) can be directly installed at four thin-walled elastic portions 13a, 13aa, 13b, 13bb so that signals according to the load can be detected.

Filters 34, 35 are mounted to both of the open end portions of the air gap 10 defined by two rectangle rigid plates 13, 14 facing each other, with a small clearance provided so that the filters do not hinder the movements of the rectangle rigid plates 13, 14.

That is, one end of the filter 34, 35 is mounted to a support 23 and the other end is mounted to a coupling support 24 with set screws. One end of a lengthy coupling plate 61 is mounted to the support 23 and the other end is mounted to the coupling support 24 with set screws. This coupling plate 61 connects a plurality of pressure converters one by one and also distributes torque caused by the pressure converters axial direction (longitudinal direction) tension or the compression direction force or torsion so that only the measurement direction earth pressure is applied to the pressure receiving surfaces of the two rigid plates 13, 14.

As FIGS. 4, 5 and 6 show, coupling portions 24b, 24bb of the support 24 are connected with set screws in the vicinity of the thin-walled elastic portions 13b, 13bb of the rectangle rigid plate 13 of the pressure converter 1 and in the vicinity of the thin-walled elastic portion 14b of the rectangle rigid plate 14.

On the other hand, the other coupling portions 24a, 24aa of the support 24 are coupled with set screws in the vicinity of the thin-walled elastic portions 15a, 15aa of the rectangle rigid plate 15 of the pressure converter 2 located on the following stage and in the vicinity of the thin-walled elastic portion 16a of the rectangle rigid plate 16.

In this way, a plurality of pressure converters are connected one by one to form a multi-stage pressure converter which can detect pressure distributed in the axial direction, that is, effective earth pressure.

Figure 15:
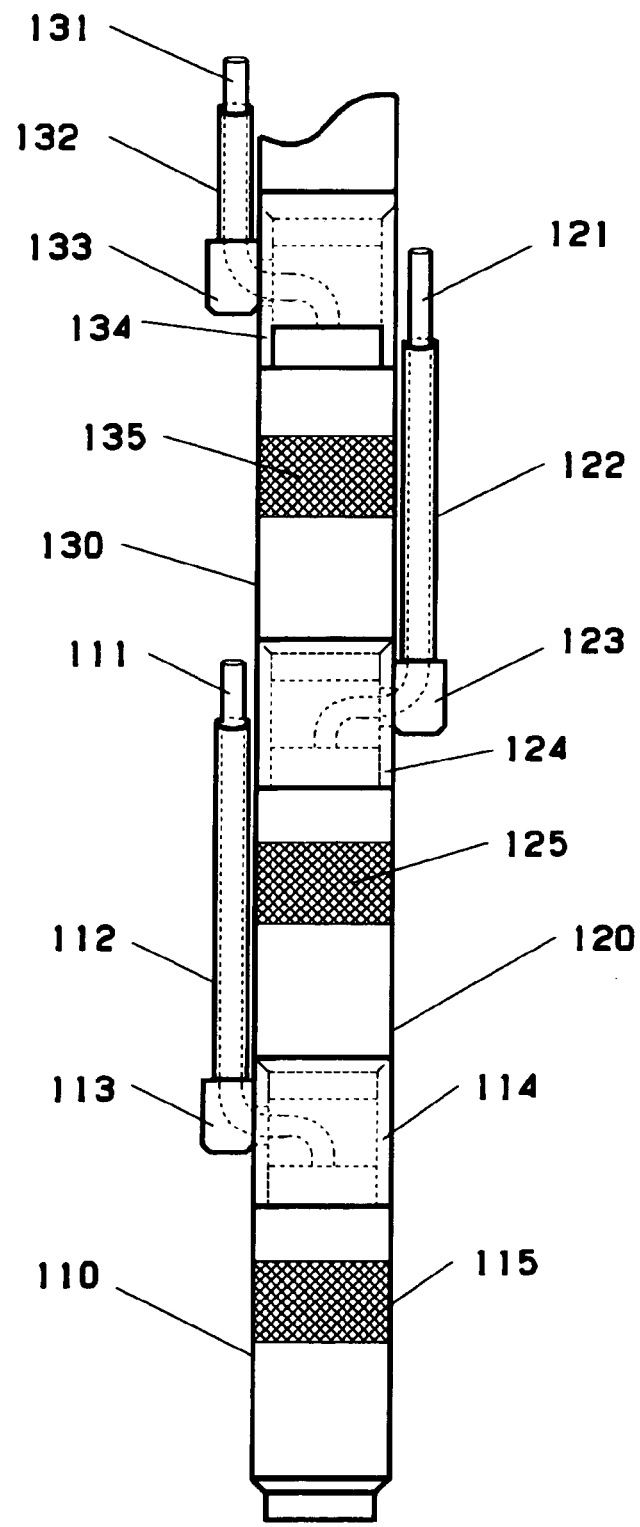
FIG. 15 is a side view showing the configuration when a plurality of effective earth pressure gauges according to other conventional examples is are connected.

A signal cable 51 for externally directing signals outputted from the load converter 41 passes through the air gap 10, defined by two rectangle rigid plates 13, 14, and then passes through a through-hole 24c drilled in the coupling support 24 that couples the pressure converters 1, 2 (FIG. 8), and subsequently in the same manner, the signal cable can pass through the air gap: 0 and the through-hole 24c. Consequently, the signal cable does not come out from the pressure converter as shown in FIG. 15.

Therefore, the signal cable does not disturb the dirt and sand around the pressure converter nor is it exposed to an environment where it is easily abraded. Accordingly, it is possible to obtain accurate measurements and increase durability, reliability and usability.

Filters 34, 35 in this third embodiment use perforated metal plates or the like so that they withstand abrasion caused when it is inserted into the ground and also help lower production costs.

Next, a fourth embodiment in which two rigid plates have different functions and shape will be explained.

As chain double-dashed lines (virtual lines) show in FIGS. 4 and 7, the shape of the transverse cross-section of the pressure receiving surface of the rigid plate 13', 14' is generally semicircular, and thin-walled elastic portions 13a, 13b, 14a, 14b are provided in the vicinity of the peripheral edge of the two rigid plates 13', 14'. The opposite surfaces from the pressure receiving surfaces inwardly face each other with a load gauge 41 interposed between the central portions of the two rigid plates 13', 14'. Furthermore, a support 23 and a coupling support 24 are interposed between the longitudinal end portions of the two rigid plates 13', 14', and filters 34, 35 are interposed between the transverse end portions.

This configuration allows the surface for sensing pressure to almost look like a wall surface of a circular bore hole. Therefore, when the earth pressure of relatively hard ground is measured, since the pressure receiving surface and the bore hole wall surface look alike, soil skeleton pressure is uniformly applied to the entire pressure receiving surface, resulting in detecting effective earth pressure that is more adaptable to the practical situation.

Moreover, the two rigid plates 13', 14' may be semi-cylindrical as long as the surface for sensing pressure is semicircular. It is also possible to bend a thick plate to form a semicircular plate and integrally fix it to each surface of the flat rigid plate 13, 14, as shown in FIG. 7, by means of welding or the like.

Between those two configurations, the latter is more advantageous because the device weighs less.

Figure 9:
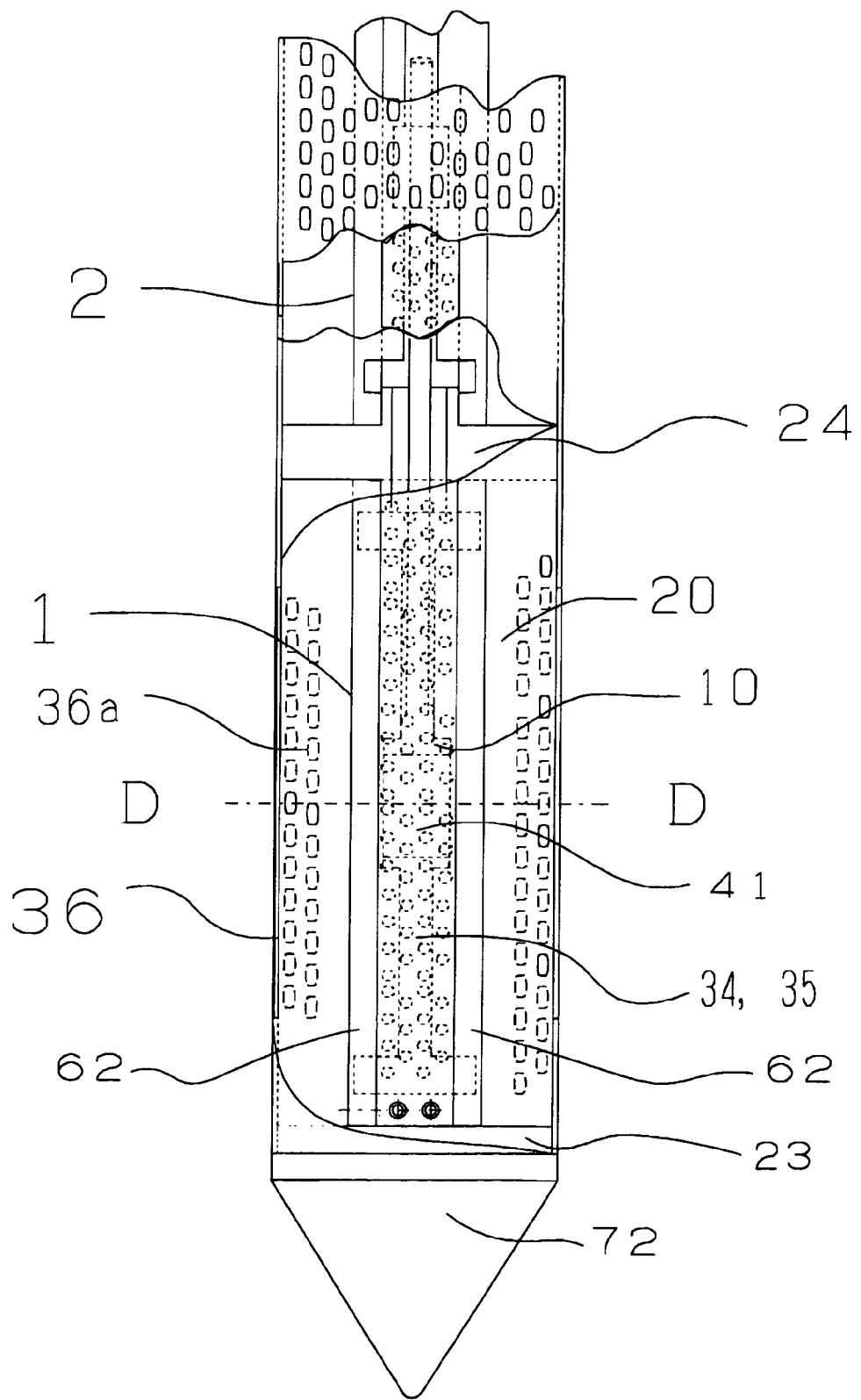
FIG. 9 is a partially broken side view showing the configuration of a pressure converter according to a fifth embodiment of the present invention, which can detect dynamic pore water pressure.
Figure 10:
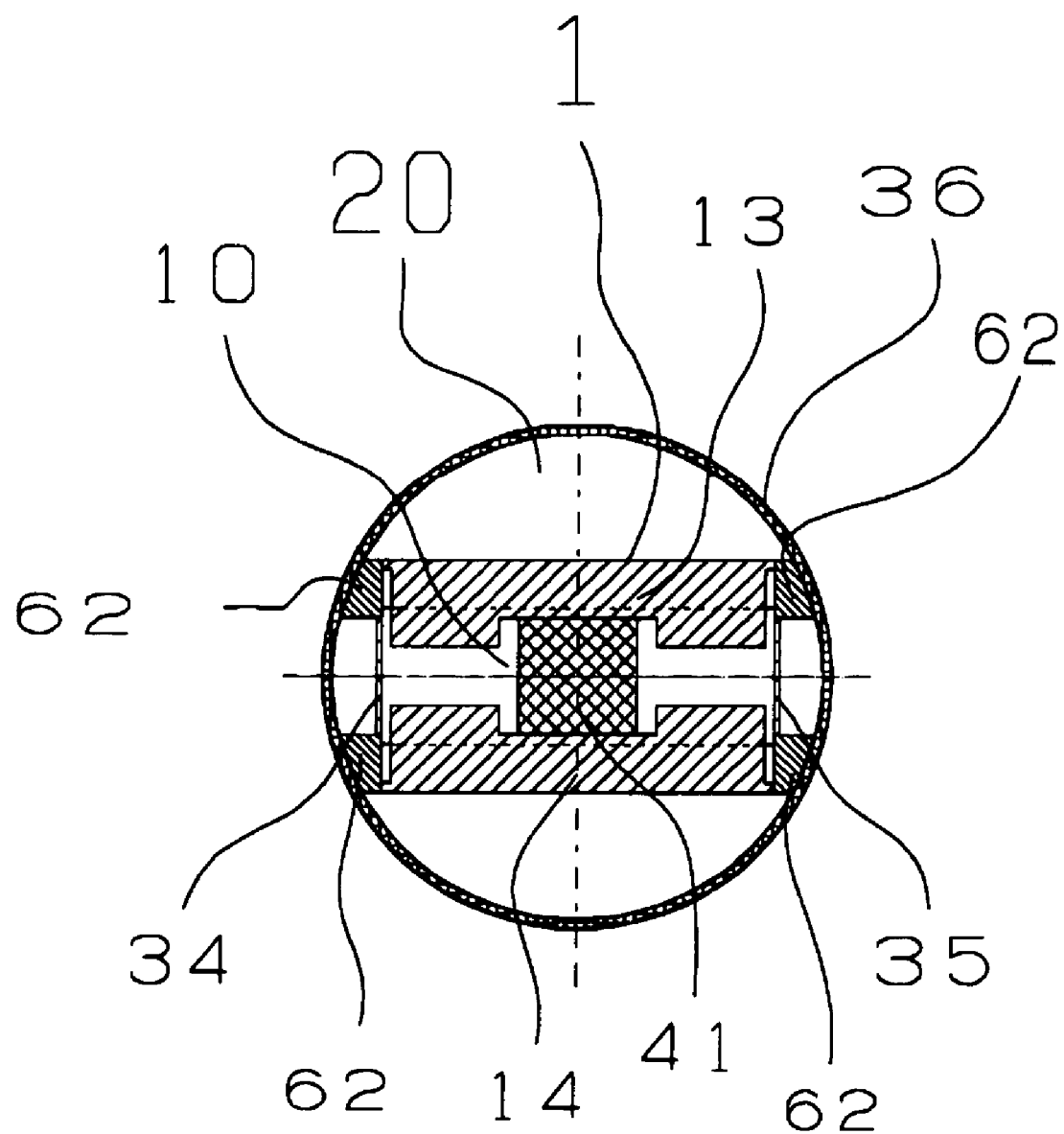
FIG. 10 is a cross-sectional view viewed in the direction of the D—D line shown in FIG. 9.

Next, FIGS. 9 and 10 show a pressure converter according of a fifth embodiment of the present invention.

FIG. 9 is a partially broken front view, and FIG. 10 is a cross-sectional view viewed in the direction of the D—D line shown in FIG. 9.

The basic configuration of the pressure converter according to a fifth embodiment is the same as the pressure converter according to a third embodiment shown in FIGS. 4 through 7. In this embodiment, first filters having slow responsiveness to hydraulic pressure are mounted to open end portions of two rigid plates 13, 14, and another cylindrical filter 35 with fast responsiveness to hydraulic pressure is disposed such that the filter surrounds the two rigid plates; and a load gauge 41 installed between the two rigid plates detects signals corresponding to the dynamic pore water pressure.

The fifth embodiment will be explained in detail by referring to FIGS. 9 and 10.

In the pressure converter 1, in the same manner as the pressure converter shown in FIGS. 4 through 7, an insertion head 72 is clamped at one end of the support 23, and a pair of rigid plates 13, 14 extend from the support 23 to the coupling support 24 and are clamped. A load gauge 41 is installed between a pair of rigid plates 13, 14.

Furthermore, first filters 34, 35 perforated with micro holes, in other words, having low responsiveness to hydraulic pressure are installed between the support 23 and the coupling support 24 and their end portions are clamped with set screws.

Moreover, altogether four coupling plates 61 are installed on the sides of those filters 34, 35 with their both ends mounted to the support 23 and the coupling support 24.

A second filter 36 perforated with large holes, in other words, having fast responsiveness to hydraulic pressure is installed such that the filter surrounds the outer circumferential surface of the pressure converter 1 which is configured as stated above.

Particularly, the second filter 36 uses a metal cylinder, which is partially perforated so that it can withstand abrasion when it is inserted into the ground.

In the pressure converter configured as stated above, as FIG. 10 shows, two air gaps are created: an internal air gap 10 defined by two rigid plates 13, 14 and two first filters 34, 35; and an intermediate air gap 20 defined by the circumferential surfaces of the two rigid plates 13, 14 and the cylindrical second filter 36.

Because capacity of the internal air gap 10 is relatively large, if a port to which pressure is applied from the first filter 34, 35 side is made narrow so as to delay response to the fluctuation of hydraulic pressure, almost no fluctuation which is almost equal to the hydrostatic pressure occurs in the internal air gap 10.

Since a measurement signal outputted from the load gauge 41 is detected as a difference between a pressure fluctuation in the intermediate air gap 20 and a pressure fluctuation in the air gap 10, a value calculated by subtracting hydrostatic pressure Pws from pore water pressure fluctuation Pwd, that is, a signal corresponding to the dynamic pore water pressure can be detected.

The cylindrical second filter's hydraulic-pressure introducing portion 36a, which is a major measurement location, functions as a filter having fast responsiveness to hydraulic pressure and the other area of the filter is used to connect a plurality of main bodies.

Now, with reference to FIGS. 11a and 11b, the principle of the load gauge 41 will be described.

Figure 11A:
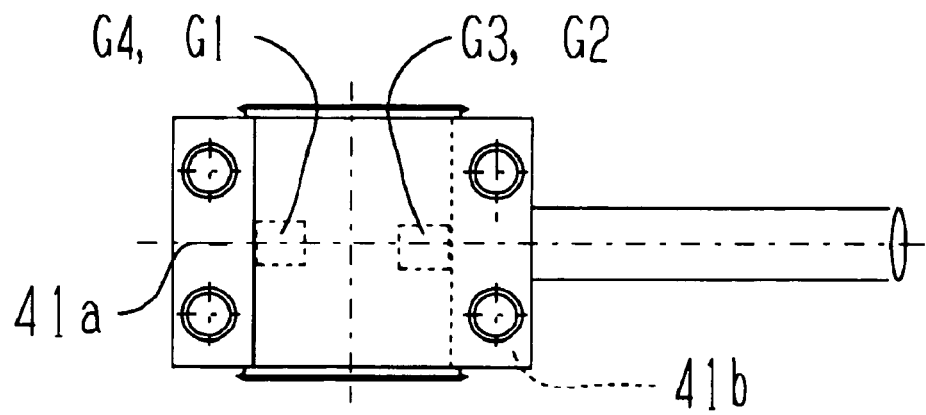
FIG. 11 is a diagram showing the principle of non-interference of hydraulic pressure in a load gauge used for first through fourth embodiments of the present invention.
Figure 11B:
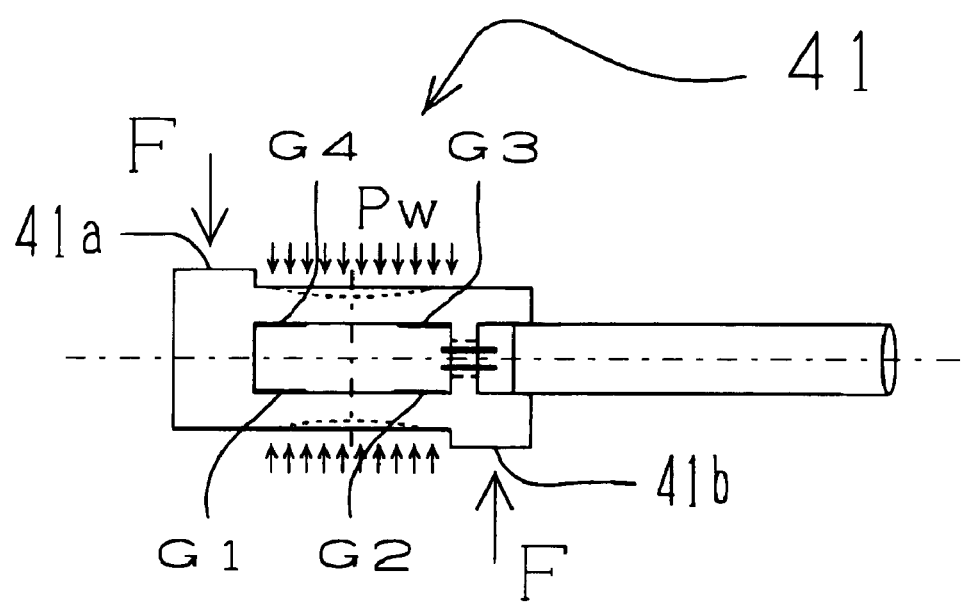
Figure 12:
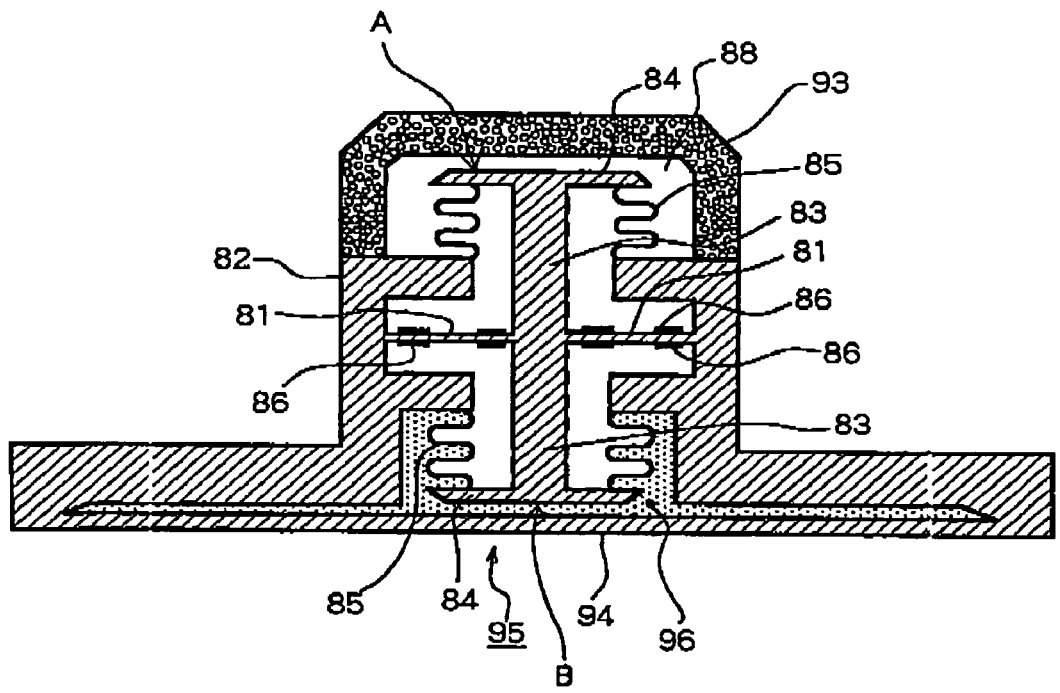
FIG. 12 is a cross-sectional block diagram of an effective earth pressure gauge according to a first conventional example.
Figure 13:
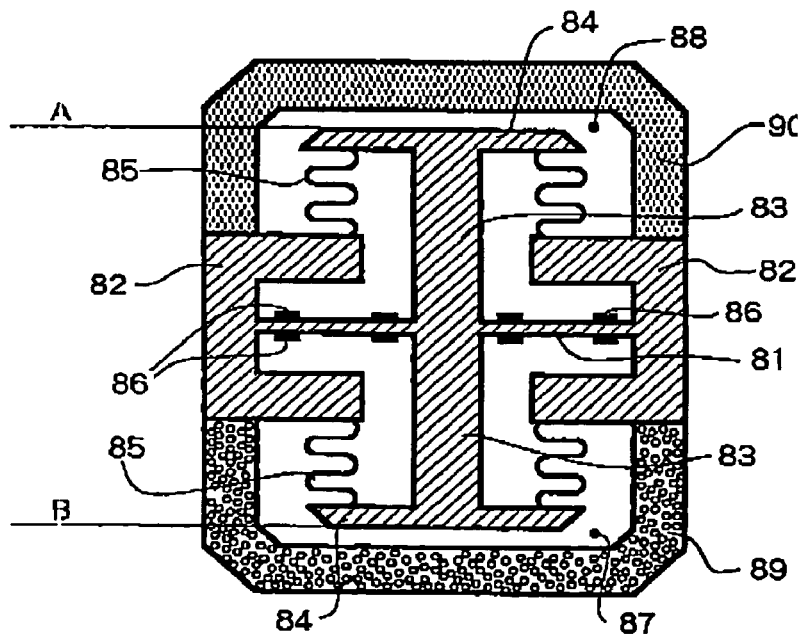
FIG. 13 is a cross-sectional block diagram of a dynamic pore water pressure gauge according to a second conventional example.
Figure 14:
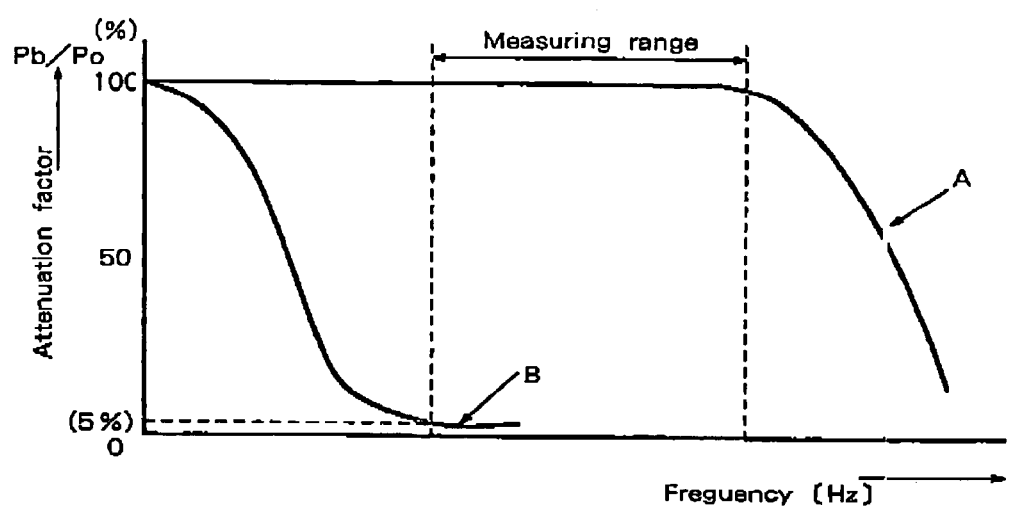
FIG. 14 is a response diagram of a dynamic pore water pressure gauge according to a second conventional example.

FIG. 11a is a plan view showing the configuration of the load gauge, and FIG. 11b is a front view showing the operation of the load gauge.

Strain gauges G1 through G4 are mounted to the bending beam of the load gauge shown in FIGS. 11a and 11b.

When load F is applied to the working points 41a, 41b at which the load is directed, gauges G1, G3 are compressed and distorted by the amount $\epsilon c = \epsilon m$, and gauges G2, G4 are pulled and distorted by the amount $\epsilon t = -\epsilon m$. Therefore, output fluctuation $\epsilon s$ of the bridge consisting of four strain gauges G1 through G4 can be expressed by the following equation:

$$\epsilon s = 2(\epsilon t - \epsilon c) \approx -4\epsilon m \qquad (3)$$

On the other hand, when hydraulic pressure Pp is applied to the bending beam, assuming that the bending beam's Young's modulus is Eb, axial direction strain $\epsilon z$ caused by hydraulic pressure Pp can be expressed by the formula $\epsilon z = Pp/Eb$, and this value becomes equal to the amount of strain in four strain gauges G1 through G4. In this case, output fluctuation $\epsilon sz$ can be expressed by the following equation:

$$\epsilon sz = 2(\epsilon z - \epsilon z) \approx 0 \qquad (4)$$

Furthermore, even if bending strain increased by em due to the influence of hydraulic pressure, the amount of strain in each strain gauge G1 through G4 is equal to the amount in the same manner as the axial strain and denoted by the same symbols. Therefore, the bridge's output fluctuation $\epsilon sm$ can be expressed by the following equation:

$$\epsilon sm = 2(\epsilon m - \epsilon m) \approx 0 \qquad (5)$$

Both equations (4) and (5) indicate that an interference output influenced by ambient pressure does not occur in principle.

In an actual load gauge that uses strain gauges, strain gauges G1 through G4 must be electrically insulated. Therefore, in the pressure converter shown in FIGS. 11a, 11b, the strain gauges are attached inside so that they do not directly come in contact with water or liquid.

Recently, optical-fiber strain gauges have been developed. In one of representative examples of the optical-fiber strain gauge, a method, which uses transmitted light and applies the transmission factor that fluctuates according to the flexion of the optical fiber, has been in the practical use. In the case of the optical fiber that uses transmitted light, one reciprocating motion of the optical fiber enables a plurality of strain measuring points to be measured. Therefore, by mounting an optical-fiber strain gauge at a bending strain detecting position of the above-mentioned bending beam's gauges G1 through G4, it is possible to configure a pressure converter, which can accurately detect the distribution of the effective earth pressure or dynamic pore water pressure.

This optical-fiber strain gauge does not require electrical insulation. Therefore, it is not necessary to have such a sealing structure as installing a strain gauge in a hollow as the device shown in FIGS. 11a, 11b does, resulting in facilitating installation of the signal line.

In the thin-walled elastic portions 13a, 13aa, 13b, 13bb shown in FIGS. 4, 5 and 6, axial strain or bending strain caused by pressure interference does not occur. Therefore, by mounting a transmissible optical-fiber strain gauge onto the opposite surface side from the pressure receiving surface sensing pressure of the thin-walled elastic portions 13a, 13aa, 13b, 13bb instead of providing a load gauge 41, it is possible to detect signals corresponding to the effective earth pressure.

Since a plurality of transmissible optical-fiber strain gauges can measure strain by one reciprocating motion of the optical fiber, a pressure converter according to the present invention makes the best use of the characteristics to significantly reduce measurement costs.

Moreover, the present invention is not limited to the embodiments which have been described and illustrated above and can be embodied in a variety of forms as long as they are not departed from the concept of the present invention.

For example, in the above statement, two rigid plates are symmetrical; however, a thin-walled portion or a thin-walled elastic portion may be provided in the peripheral edge portion of only one rigid plate.

This configuration eliminates the necessity to create a groove and slit to form a thin-walled elastic portion on the other rigid plate, resulting in reduction of production costs.

However, the above-mentioned embodiments, which use a pair of symmetrical-shaped rigid plates, are more advantageous because they are more sensitive and can more accurately detect effective earth pressure or dynamic pore water pressure.

Furthermore, the spring constant of the thin-walled portion or thin-walled elastic portion may be adjusted by creating a letter-U-shaped slit, which can be seen in the thin-walled elastic portions 13a, 13aa or thin-walled elastic portions 13b, 13bb in FIGS. 5 and 6.

If thin-walled portions are designed to have a small spring constant, resulting in a possibility of being broken due to insufficient strength, a slit can be provided to make thin-walled elastic portions 13a, 13aa, 13b, 13bb narrow but thick, thereby making them sufficiently strong.

Furthermore, it is also possible to process thin-walled elastic portions 13a, 13aa, 13b, 13bb into an accurately machined unit and then clamp it at a specified location with set screws.

As is clear from the above statement, according to the present invention, it is possible to detect fluctuation of the effective earth pressure by a load gauge which is installed in the air gap defined by a filter that prevents the application of the soil skeleton pressure and two rigid plates and does not cause output fluctuation due to the influence of hydrostatic pressure. It is also possible to coincide the effective earth pressure measurement position with the pore water pressure application position at the time of the measurement. Accordingly, because there is no head difference between the position and the pressure loading position, it is possible to provide a pressure converter, which is capable of accurately measuring the effective earth pressure.

According to the present invention, a thin-walled elastic portion is disposed at an end portion of at least one of two rigid plates so that a load in proportion to earth pressure can be transmitted to the load gauge without disturbing the deformation by earth pressure. Because the end portions of the two rigid plates can be clamped, this configuration makes it possible to provide a pressure converter, which facilitates transportation and installation and also enables stable measurement of the effective earth pressure.

According to the present invention, the shape of the pressure receiving surface of said rigid plate is circular, a thin-walled elastic portion is disposed in the vicinity of the peripheral edge of the opposite surface from the pressure receiving surface of at least one rigid plate, said two rigid plates are disposed so that their opposite surfaces from the pressure receiving surfaces inwardly face each other, said load gauge is interposed between the central portions of said two rigid plates, and a support and a filter are interposed between the peripheral edge portions of said two rigid plates. Thus, it is possible to provide a pressure converter, which is suitable in cases when the ground of the measurement site is flat and a device to be buried must be circular, and is also versatile, has a simple configuration that requires low production cost and is capable of accurately detecting the effective earth pressure.

Furthermore, according to the present invention, the shape of the pressure receiving surfaces of two rigid plates is rectangle, a thin-walled elastic portion is disposed in the vicinity of the longitudinal end portion of the opposite surface from the pressure receiving surface of at least one rigid plate, the opposite sides of the pressure receiving surfaces inwardly face each other, said load gauge is interposed between the central portions of said two rigid plates, a support is interposed between the longitudinal end portions of said two rigid plates, and a filter is interposed between the transverse end portions of said two rigid plates. This configuration can be applied to a single use of a pressure converter; however, when a plurality of pressure converters are connected in a longitudinal column to form a multi-stage arrangement so as to measure the distribution of effective earth pressure at a plurality of positions, it is possible to provide a slim configuration. As a result, it is possible to provide a pressure converter which can easily be inserted into a relatively small bore hole and can easily and accurately detect the effective earth pressure.

According to the present invention, the shape of the transverse cross-section of the pressure receiving surface of said rigid plate is generally semicircular, a thin-walled elastic portion is disposed in the vicinity of the longitudinal end portion of at least one rigid plate, the opposite sides of the pressure receiving surfaces inwardly face each other, said load gauge is interposed between the central portions of said two rigid plates, and a support and a filter are interposed between the end portions of said two rigid plates. Therefore, when the pressure converter is inserted into a bore hole the outer circumferential surface of the pressure converter uniformly comes in contact with the inner wall of the bore hole. As a result, it is possible to provide a pressure converter, which senses fluctuation of the ground more a accurately when it is buried in the ground, thereby more accurately detecting the effective earth pressure.

According to the present invention, said two rigid plates are coupled in the longitudinal direction in a multi-stage arrangement, and an output signal cable of said load gauge successively passes through an air gap defined as the result of said load gauge being interposed between said two rigid plates. Accordingly, the signal cable dose not come out from the pressure converter, and therefore, the signal cable does not interfere with the observed earth pressure as it does in the conventional examples nor is it exposed to an environment where it is abraded. As a result, it is possible to provide a pressure converter, which can detect the effective earth pressure distributed in the longitudinal direction.

Furthermore, according to the present invention, a thin-walled elastic portion is disposed at an end portion of at least one of two rigid plates which receive earth pressure, an optical-fiber strain gauge or strain gauge is attached to the opposite surface side from the pressure receiving surface of said thin-willed elastic portion, the opposite sides of the pressure receiving surfaces inwardly face each other, a support and a filter are interposed between the end portions of said two rigid plates, and said optical-fiber strain gauge or strain gauge, which does not cause output fluctuation even if air pressure and hydraulic pressure are directed via said filter and applied between said two rigid plates, detects a signal corresponding to the effective earth pressure. Accordingly, this pressure converter does not require a separate load gauge, and an optical-fiber strain gauge or a strain gauge may be directly attached to the thin-walled elastic portion, resulting in cost reduction. Therefore, it is possible to provide a load converter (=pressure converter) which has the same effects as the present invention.

According to the present invention, a filter having slow responsiveness to hydraulic pressure is interposed between the end portions of said two rigid plates which receive hydraulic pressure, a load gauge is interposed between the central portions of said two rigid plates, a filter having fast responsiveness to hydraulic pressure is disposed so that it surrounds said two rigid plates, and said load gauge detects a signal corresponding to the dynamic pore water pressure. Therefore, it is possible to provide an inexpensive, small pressure converter, which does not use bellows as does the above-mentioned second conventional example. Moreover, the pressure converter has an excellent resolution and can accurately measure the low dynamic pore water pressure in the ground because it is not affected by hydrostatic pressure caused by water depth and soil pressure. As a result, it is possible to monitor very small earth pressure fluctuation that occurs in the ground thereby contributing to disaster prediction.

According to the present invention, a thin-walled elastic portion is disposed at an end portion of at least one of two rigid plates which receive earth pressure, an optical-fiber strain gauge or strain gauge is attached to the opposite surface side from the pressure receiving surface of said thin-walled elastic portion, the opposite sides of the pressure receiving surfaces inwardly face each other, a filter having slow responsiveness to hydraulic pressure is interposed between the end portions of said two rigid plates, a filter having fast responsiveness to hydraulic pressure is disposed so that it surrounds said two rigid plates, and said optical-fiber strain gauge or strain gauge detects a signal corresponding to the dynamic pore water pressure. Therefore, it is possible to provide an inexpensive, simply configured pressure converter, which is cable of detecting dynamic pore water pressure without being influenced by hydrostatic pressure caused by the depth of installation.

Moreover, according to the present invention, a plurality of supports areis provided between adjacent pressure converters, and a coupling plate extends between adjacent supports and is mounted to said supports so as to connect a plurality of pressure converters in a longitudinal column arrangement, thereby distributing loads in the directions other than the measurement direction to said supports and said coupling plate. Therefore, a plurality of pressure converters is are fly connected and the strength in the direction of compression and torsion strength are reinforced, thereby preventing the pressure converter from being damaged when it is inserted into a bore hole. Also, it is possible to provide a pressure converter, which can detect effective earth pressure distributed in the longitudinal direction while preventing pressures other than the pressure in the direction of the measurement from being applied to the pressure converter at the time of the measurement.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

The invention claimed is:

1. A pressure converter, comprising:
   two rigid plates facing each other, said rigid plates receiving earth pressure, the earth pressure being a sum of pore pressure and soil skeleton pressure;
   a load gauge, which does not cause output fluctuation even if air pressure and hydraulic pressure are directed via a filter and applied between two rigid plates, said gauge being installed in an air gap defined by said two rigid plates;
   a filter interposed between end portions of said two rigid plates; and
   said load gauge detecting a signal corresponding to the effective earth pressure, the effective earth pressure being the soil skeleton pressure.

2. A pressure converter according to claim 1, wherein
   a thin-walled elastic portion is disposed at an end portion of at least one of said two rigid plates so that a load in proportion to earth pressure can be transmitted to said load gauge.

3. A pressure converter according to claim 1, wherein
   the shape of an exterior surface of said rigid plate is circular;
   a thin-walled elastic portion is disposed in the vicinity of the peripheral edge of the opposite surface from the pressure receiving surface of at least one rigid plate;
   said two rigid plates are disposed so that their opposite surfaces from the pressure receiving surfaces inwardly face each other;
   said load gauge is interposed between the central portions of said two rigid plates; and
   a support and said filter are interposed between the peripheral edge portions of said two rigid plates.

4. A pressure converter according to claim 1, wherein
   the shape of the pressure receiving surface of said rigid plate is rectangle;
   a thin-walled elastic portion is disposed in the vicinity of the longitudinal end portion of the opposite surface from the pressure receiving surface of at least one said rigid plate;
   the opposite sides of the pressure receiving surfaces inwardly face each other;
   said load gauge is interposed between the central portions of said two rigid plates;
   a support is interposed between the longitudinal end portions of said two rigid plates; and
   said filter being interposed between opposing side end portions of said two rigid plates.

5. A pressure converter according to claim 1, wherein
   the shape of the cross-section of the pressure receiving surface of said rigid plate, perpendicular to a long axis of said rigid plate, is generally semicircular;
   a thin-walled elastic portion is disposed in the vicinity of the longitudinal end portion of at least one rigid plate;
   the opposite sides of the pressure receiving surfaces inwardly face each other;
   said load gauge is interposed between the central portions of said two rigid plates;
   a support is interposed between the longitudinal end portions of said two rigid plates; and
   said filter being interposed between opposing side end portions of said two rigid plates.

6. A pressure converter according to claim 1, wherein
   said two rigid plates are coupled in the longitudinal direction; and
   an output signal cable of said load gauge successively passes through said air gap defined as the result of said load gauge being interposed between said two rigid plates.

7. A pressure converter, wherein
   two rigid plates facing each other, said rigid plates receiving earth pressure, the earth pressure being a sum of pore pressure and soil skeleton pressure;
   a thin-walled elastic portion is disposed at an end portion of at least one of said two rigid plates;
   an optical-fiber strain gauge or strain gauge is attached to the opposite surface side from the pressure receiving surface of said thin-walled elastic portion;
   the opposite sides of the pressure receiving surfaces inwardly face each other;
   a support and a filter are interposed between the end portions of said two rigid plates; and
   said optical-fiber strain gauge or strain gauge, which does not cause output fluctuation even if air pressure and hydraulic pressure are directed via said filter and applied between said two rigid plates, detecting a signal corresponding to the effective earth pressure, the effective earth pressure being the soil skeleton pressure.

8. A pressure converter, wherein
   a filter having slow responsiveness to hydraulic pressure is interposed between end portions of two rigid plates which receive hydraulic pressure;
   a load gauge is interposed between the central portions of said two rigid plates;
   a filter having fast responsiveness to hydraulic pressure is disposed so that it surrounds said two rigid plates; and
   said load gauge detects a signal corresponding to the dynamic pore water pressure.

9. A pressure converter, wherein
a thin-walled elastic portion is disposed at an end portion of at least one of two rigid plates which receive earth pressure;
an optical-fiber strain gauge or strain gauge is attached to the opposite surface side from the pressure receiving surface of said thin-walled elastic portion;
the opposite sides of the pressure receiving surfaces inwardly face each other;
a filter having slow responsiveness to hydraulic pressure is interposed between the end portions of said two rigid plates;
a filter having fast responsiveness to hydraulic pressure is disposed so that it surrounds said two rigid plates; and
said optical-fiber strain gauge or strain gauge detects a signal corresponding to the dynamic pore water pressure.

10. A pressure converter according to claim 6, further comprising
a plurality of supports provided between longitudinally coupled rigid plates; and
a coupling plate extending between adjacent supports, said coupling plate being mounted to said supports so as to connect a plurality of pressure converters in a longitudinal column arrangement.

* * * * *